United States Patent [19]  [11]  4,082,890
Burton et al.  [45]  Apr. 4, 1978

[54] DECORATIVE SHEET MATERIAL

[75] Inventors: Arthur Burton, Denton; David Robert Reed, Hyde, both of England

[73] Assignee: Imperial Chemical Industries Limited, London, England

[21] Appl. No.: 630,686

[22] Filed: Nov. 10, 1975

[30] Foreign Application Priority Data

Nov. 27, 1974 United Kingdom .............. 51363/74

[51] Int. Cl.² ............................................. B32B 5/16
[52] U.S. Cl. .................................. 428/328; 428/330; 428/350; 428/354; 428/539; 428/913
[58] Field of Search ............... 428/350, 328, 330, 913, 428/355, 476, 486, 354, 40, 906, 539; 427/207 R, 207 D, 205, 202; 156/326

[56] References Cited

U.S. PATENT DOCUMENTS

| 2,170,654 | 8/1939 | Dalton .................................. 428/906 |
| 2,424,546 | 7/1947 | Bauer et al. ........................... 428/350 |
| 3,104,179 | 9/1963 | Prior ..................................... 428/350 |
| 3,887,748 | 6/1975 | Swedenberg et al. ................ 428/247 |
| 3,950,593 | 4/1976 | Bomball et al. ....................... 428/476 |

FOREIGN PATENT DOCUMENTS 1,377,085  12/1963  France ................................ 428/350

*Primary Examiner*—George F. Lesmes
*Assistant Examiner*—Stanley S. Silverman
*Attorney, Agent, or Firm*—Cushman, Darby & Cushman

[57] ABSTRACT

A decorative sheet material having a decorative surface and a working surface, the working surface being provided with a coating of a water-activatable adhesive, in which the improvement is disposing a coating of a dry powdered deliquescent material on the adhesive coating.

5 Claims, No Drawings

DECORATIVE SHEET MATERIAL

This invention relates to decorative sheet materials for applying to walls, ceilings, floors, tables, shelves and other surfaces within a house, factory or place of amenity.

Such materials, particularly wallcoverings, are normally adhered to the relevant surface by application of a liquid adhesive, often an aqueous paste of a cellulosic material, such as sodium carboxymethyl cellulose. The paste has first to be made from a dry powder and then brushed on to the working surface of the sheet material which is then placed in position on the surface. This process is both time consuming and also requires considerable dexterity to prevent damage to the sheet material, particularly a wallpaper, when it is applied to the surface.

A modification of this method is to apply the adhesive on to the working surface of the sheet material at the manufacturing stage so that it can be reactivated by wetting with water, but this does not obviate the need for wetting out and handling the wet sheet material.

It is also known to provide the working surface of such materials, particularly wallcoverings, with a coating of a permanently tacky pressure-sensitive adhesive. When, as is usual, such materials are to be sold in a rolled-up form then a release paper or foil is applied over the adhesive layer before the sheet material is rolled up. This prevents the adhesive from coming into contact with the other, decorative, surface of the sheet material so preventing adhesion to that surface. However the need to use a release paper or foil to prevent adhesion to the decorative surface considerably adds to the production costs and makes the application of the material to a surface difficult because of the need to remove the release paper or foil. Also the intrinsic tackiness of pressure sensitive adhesives makes accurate positioning, for pattern matching etc., extremely difficult.

According to one aspect of the present invention we provide a decorative sheet material having a decorative surface and a working surface, the working surface being provided with a coating of a water-activatable adhesive which itself is provided with a coating of a dry powdered deliquescent material.

According to another aspect of the invention we provide a process for the manufacture of a roll of a decorative sheet material which comprises the steps of providing a sheet material having a decorative surface and a working surface, applying on to the working surface a coating of a water-activatable adhesive, applying on to the surface of the adhesive coating a dry coating of a deliquescent material, rolling up the sheet material to form a roll having a plurality of turns in which the coating of the deliquescent material contacts the decorative surface of the sheet material and packaging the roll in such a manner that air, and hence moisture, in the atmosphere is prevented from contacting the rolled-up sheet material. Conveniently the rolled up sheet material is stored in a sealed bag which is impermeable to moisture-vapour in the air.

The adhesive coating remains inactive during storage in the absence of water. When the decorative sheet material is rolled-up the adhesive does not adhere to the decorative surface of the sheet material. However on exposure of the sheet material to the atmosphere for a short time, the deliquescent material absorbs sufficient water from the surrounding air to activate the adhesive. At this stage the sheet material can be positioned by sliding on the relevant surface and when located in the desired position can be adhered to the surface by the application of hand pressure to the decorative surface of the sheet material. After the sheet material has been adhered to the surface, particularly if the surface is porous, the adhesive bond increases in strength and satisfactory bonding is achieved. This is believed to be caused by the migration of water into the surface and into and, where appropriate, through the sheet material.

However we have found it advantageous to incorporate in the adhesive either a material which absorbs water or a material which reacts with water. The incorporation of such a material in the adhesive serves to remove from the activated adhesive any excess water which might be present and so assists in the development of a satisfactory bond. Such materials as plaster of Paris, Portland cement and other cementitous material have been found to be particularly useful for this purpose.

An adhesive which is soluble in or activated by water may be used in the invention. Suitable adhesives are those based on starch, starch derivatives, cellulose derivatives, polyvinyl alcohol, polyvinyl acetate, polyacrylates and other natural and synthetic materials or blends thereof. In preference, however, we use a pressure sensitive adhesive such as that sold by Samuel Jones Limited under the reference ARG 746. Desirably the adhesive is suitably formulated to provide the desired degree of slip and final adhesion. Preferably the coating weight of the water activatable adhesive will lie in the range 5 grams per square meter to 50 grams per square meter and more preferably in the range 10 to 30 grams per square meter.

The powdered coating which is applied over the surface of the adhesive layer may be based on any suitable deliquescent material, examples of which are lithium chloride, calcium chloride, magnesium chloride, ferric chloride, calcium nitrate. The critical factor in the selection of a suitable material is the rate at which the material absorbs water from the atmosphere and this is related to the size of the particles of the material and the relative humidity of the atmosphere. In general for most conditions of relative humidity which are likely to be encountered and with the above materials a suitable average particle size can be selected below 200 microns. Usually the coating weight of the powdered deliquescent material will be up to 100% of the adhesive weight and more preferably between 5 and 50% of the adhesive weight.

The decorative sheet material may be a wallcovering. This may take the form of a wallpaper having a decoration which has been applied directly on to the surface of the wallpaper. Alternatively the wallcovering may be of the washable type comprising one or more paper plies provided on the decorative surface with a coating of a water-impermeable material such as polyvinyl chloride or other synthetic plastics material. In this case the decoration, which may be in the form of a printed pattern and/or an embossed design is applied on the plastics coating. As a further alternative the wallcovering may be a foil or film based on a synthetic plastics material, such as polyethylene, polypropylene, polystyrene or polyvinyl chloride, which may be either cellular or non-cellular.

The decorative sheet material may alternatively be any other sheet material such as a floorcovering for attachment to a surface through the medium of an adhesive.

The invention will now be described with reference to the following Examples:

EXAMPLE 1

A length of a printed and embossed wallcovering based on a sheet of formed polyethylene was coated on its working surface with a coating of an adhesive composition comprising a commercially available adhesive sold by Samuel Jones Limited under the reference ARG 746. The applied coating weight was between 15 and 20 grams per square meter. The coated wallcovering was passed through an oven maintained at a temperature of 70° C and the solvent present in the adhesive evaporated off.

To the solvent-free, but still tacky, adhesive surface was applied a continuous coating of powdered (particle size less than 60 microns) anhydrous calcium chloride. This removed the tackiness from the adhesive coating and allowed the sheet to be rolled up without the adhesive adhering to the decorative surface. The rolled-up wallcovering was stored in a moisture vapour-impermeable bag. After a few days, the roll of wallcovering was removed from the bag and cut to a suitable length for decorating a wall. The length of wallcovering was exposed to the atmosphere for between 10 and 15 minutes depending on the ambient conditions and this rendered the surface of the adhesive layer fluid and in a condition which allowed the length of wallcovering to be positioned on the wall by sliding it about. When in position it could then be adhered to the wall by hand pressure.

Within a few tens of minutes or several hours depending on the nature and absorbency of the wall a satisfactory bond is achieved.

EXAMPLE 2

Example 1 was repeated except that powdered lithium chloride (having a particle size less than 60 microns) was used instead of powdered calcium chloride. However, under the same ambient conditions as those prevailing in Example 1, the adhesive was rendered tacky in only 5 to 10 minutes.

EXAMPLE 3

A length of a printed and embossed polyvinyl chloride coated paper wallcovering (as sold by Imperial Chemical Industries Limited under the Registered Trade Mark "Vymura") was provided on its working surface with a dry coating of an adhesive composition based on a starch derivative. The applied coating weight was between 25 and 30 grams per square meter.

The surface of the adhesive was moistened with water and to the moist surface was applied a continuous coating of powdered (particle size less than 60 microns) lithium chloride. The powder adhered to the adhesive. The coated wallcovering was now passed through an oven maintained at a temperature of 110° C in order to dry the coating. The wallcovering was then subjected to the same precedure as outlined in Example 1 with the similar results.

We claim:

1. A decorative sheet material having a decorative surface and a working surface, the working surface being provided with a coating of a water-activatable adhesive, the improvement comprising providing on the adhesive coating a coating of a dry powdered deliquescent material, said powdered deliquescent material having an average particle size of less than 200 microns.

2. A decorative sheet material as claimed in claim 1 in which the deliquescent material is selected from the group comprising lithium chloride, calcium chloride, magnesium chloride, ferric chloride, calcium nitrate or mixtures of two or more of these materials.

3. A decorative sheet material as claimed in claim 1 in which the weight of the coating of the deliquescent material is between 5% and 50% of the weight of the coating of the adhesive.

4. A decorative sheet material having a decorative surface for application to a second surface wherein said material may be adhered to said second surface by the application of hand pressure, said material comprising said decorative surface and a working surface which is provided with a coating of a water-activatable adhesive, the improvement consisting essentially of a coating, disposed on said working surface, said coating comprising a dry powdered deliquescent material having an average particle size of less than 200 microns, which absorbs sufficient amounts of water from the surrounding air to activate said adhesive and to adhere said decorative sheet material to said second surface.

5. The decorative sheet material of claim 4, in which the deliquescent material is selected from the group consisting of lithium chloride, calcium chloride, magnesium chloride, ferric chloride, calcium nitrate and mixtures thereof.

* * * * *